United States Patent [19]

Moellmann

[11] Patent Number: 4,900,243
[45] Date of Patent: Feb. 13, 1990

[54] MOLDING APPARATUS

[75] Inventor: Guenter Moellmann, Hagan, Fed. Rep. of Germany

[73] Assignee: Fritsche, Moellman GmbH & Co. KG, Lotte, Fed. Rep. of Germany

[21] Appl. No.: 275,742

[22] Filed: Nov. 21, 1988

[30] Foreign Application Priority Data

Dec. 15, 1987 [EP] European Pat. Off. ........ 87118612.8

[51] Int. Cl.⁴ .................................................. B28B 3/00
[52] U.S. Cl. ..................................... 425/406; 100/219; 100/228; 425/450.1; 425/451.9; 425/589; 425/595; 425/817 R; 425/DIG. 221
[58] Field of Search ............... 425/451.5, 451.6, 451.7, 425/450.1, 589, 592, 593, 595, DIG. 221, DIG. 220, 412, 193, 406, 150, 135, 451.9, 554, 451.2, 451, DIG. 222, 4 R, 817 R; 100/214, 228, 258, 219; 248/669

[56] References Cited

U.S. PATENT DOCUMENTS

| 2,335,807 | 11/1943 | Smith | 425/DIG. 220 |
| 3,816,044 | 6/1974 | Nielsen et al. | 425/157 |
| 3,862,596 | 1/1975 | Putkowski | 100/219 |
| 4,461,456 | 6/1984 | Munna | 254/88 |
| 4,563,143 | 1/1986 | Pettersson | 425/151 |
| 4,571,169 | 2/1986 | Shima et al. | 425/451.9 |
| 4,690,049 | 9/1987 | Malashenko | 100/214 |

FOREIGN PATENT DOCUMENTS

| 377094 | 6/1964 | Switzerland . |
| 1032477 | 6/1966 | United Kingdom . |
| 2005186 | 4/1979 | United Kingdom . |
| 2031787 | 4/1980 | United Kingdom . |

Primary Examiner—Jay H. Woo
Assistant Examiner—K. P. Nguyen
Attorney, Agent, or Firm—Karl F. Milde, Jr.

[57] ABSTRACT

A molding apparatus for producing a molding from multi-component plastic, especially polyurethane. The upper and lower parts of the mold are fastened, respectively, on mold holders of which at least one is movable relative to the other and can be propped in a closed position in which the upper mold part and lower mold part are still at a slight distance apart. Starting out from this closed position the upper and lower mold parts can be brought together and pressed against each other by a jacking device which is provided on at least one of the mold holders.

7 Claims, 4 Drawing Sheets

MOLDING APPARATUS

BACKGROUND OF THE INVENTION

The present invention relates to an apparatus for the production molding of a multi-component plastic, especially polyurethane. The molding apparatus includes a stand and two mold parts affixed to mold holders in the stand. These mold parts can be brought by movement of at least one of the mold holders to a first position in which the parts are a small distance apart. The mold holders have back surfaces extending substantially transversely to the direction of the closing movement. The molding apparatus further includes a propping system, provided on the sides of the mold holders that face away from the mold parts, which is movably mounted on the stand. The propping system has propping elements which in the first position can be brought into engagement with the back surfaces of the mold holders. Finally, the molding apparatus includes a jacking system on at least one mold holder by which the mold parts can be brought closer together and jacked into a second position with the propping system engaged.

Molding apparatus of the type described above is disclosed in the Swiss Patent No. 377,094. It serves for the production of moldings from thermoplastics. The jacking system in this apparatus consists of a press piston of large diameter which can be displaced in the one mold holder and which, in turn, encloses an auxiliary piston of small diameter held in the stand and having a coaxial working cylinder. The mold holder described is thus movable with respect to the other mold holder, which makes it possible to bring the two mold parts up to a small distance apart by energizing the auxiliary piston. They are held in this position by abutments which, when the working cylinder is extended, are deployed from two slots that are situated opposite one another and reach below the bottom of the working cylinder. The auxiliary piston is thus not under hydraulic pressure during the subsequent delivery of pressure to the pressing piston, which permits the achievement of great closing pressure in the mold. The relatively movable mold holder, however, has a great inertial mass as a result of the inclusion of the pressing piston and working cylinder in its weight, and this militates against the achievement of short cycling times during normal operation.

Another molding apparatus of this type is disclosed in the U.S. Pat. No. 3,816,044. In the closed position, in which the mold parts are at a short distance from one another, the two mold holders are propped by locking closures that are mounted in the stand and are at an invariable distance apart. The masses that are moved in the opening and closing of the mold, however, are also very great.

Still another molding apparatus of this type is disclosed in German Utility Model Patent No. 84 17 747. The closing movement and propping function in this device are performed by a piston-and-cylinder unit which introduces the necessary forces through punctiform node points into both mold holders. The mold holders and the piston-and-cylinder units must be made correspondingly sturdy and, on account of this great weight, relatively high acceleration forces are produced during rapid opening and closing actions, making it difficult to sensitively control the closing force. The use of complex control and auxiliary units for the achievement of satisfactory performance is indispensible in this device.

SUMMARY OF THE INVENTION

It is a principal object of the present invention to develop a molding apparatus of the type described above which achieves a substantial reduction of the weight of the masses that are moved during use of the apparatus.

This object, as well as other objects which will become apparent from the discussion that follows, are achieved, according to the invention, in a molding apparatus of the type described above, in that the propping elements are in the form of levers, that the levers are ganged together on shafts and can be brought with their end faces into engagement with the back surfaces of the movable mold holder, and that the shafts are journaled in the stand on the side of the movable mold holder facing away from the mold parts. The common drive is thereby simplified.

The levers can be columnar in shape. In this case they are light in weight and have especially great compressive strength in the longitudinal direction.

In an embodiment in which the shafts are journaled in the stand in the plane of movement of the back surfaces when the mold holders are propped up, the levers are aligned with the direction of the introduced forces, thereby assuring optimum utilization of their compressive strength. The levers can thus be made very light and accordingly will be easily movable so that their operation will not produce any disturbing effects in the stand. Nevertheless, the result is the addition of the flexural strength of the shaft to that of the mold holders, which permits the latter to be of very light construction and thus makes it possible to achieve a substantial reduction of the inertial masses that are to be moved during the normal working cycle. In addition, transverse forces are avoided, making it possible to reduce the cost of the guides between the stand and the relatively movable mold holder and yet to obtain a highly precise interrelationship in every relative position. Also the mechanical wear is substantially reduced in the this area.

The advantageous effects described above are especially apparent when the levers are distributed over the entire length of the movable mold holder and are kept at a constant distance apart on the shafts. The flexural stress on the movable mold holder in the direction of its longitudinal axis is accordingly low and permits a light-weight design. As a result, good acceleration can be achieved in the opening and closing of the mold even when relatively low driving forces are used. The cycling time is accordingly short thus facilitating the use of the mold in mass production operations.

In another embodiment of the invention provision is made for the levers to be fastened to contrarily revolving shafts arranged adjacent one another in pairs, and for these shafts to be distributed in the stand substantially transversely of the direction of the closing movement. Therefore, when the mold is opening, they are situated underneath the mold holder, which facilitates access. In an embodiment in which the levers of each pair of shafts are staggered from one another and thus can be alternated with one another, the possibility is achieved of increasing the length of the levers and thus the length of the stroke of the movable mold holder. This arrangement improves the accessibility of the opened mold, for example for the purpose of charging the molds and changing them.

The aforementioned back surfaces are on the side of the relatively movable mold holder facing away from the mold parts. This mold holder can be comprised of a rectangular plate, in which case the back surfaces are preferably arranged in the area of the longitudinal edges of the plate. The levers can accordingly be made relatively long, thus improving the accessibility of the open mold.

By mechanically propping the mold holder in the first position (i.e., the position at the end of the initial stroke), the mechancal system that transports the movable mold holder to this first position is protected, during operation, against the action of the closing forces produced by the jacking system. It is therefore sufficient to design this system to provide only for moving (and not holding) the mold holder; this can be accomplished with apparatus of relatively small size which is easy to install. Such apparatus is available at reasonable cost, thus offering the possibility of having, if desired, a large number of such apparatus engaging a respectively large number of points. This construction permits a light construction of the mold holder, thereby reducing its weight to achieve easier movement.

In the first position, in which the two mold parts are at a short distance apart, the mold holder of the relatively movable unit is held down and supported with its back surfaces statically resting against the levers. This arrangement normally does not result in any irregular wear in the area of the surfaces in contact with one another. Even after long use, therefore, a precise relationship between the two mold parts in the first position is always assured.

The relatively movable mold holder is supported on the levers at a plurality of back surfaces. This results in the application of force at a plurality of points making it possible to make the mold holder light in weight, depending on the number and interrelationship of these points, and thus making it easy to move the mold holder without the need to accept any loss of rigidity. This is of considerable advantage with respect to the design of the corresponding system of movement.

In the first position, in which the relatively movable mold holder is propped up by the levers, the upper part and lower part of the mold are at a slight distance apart. The continued closing of the distance between the two parts and their subsequent compression together is then brought about exclusively by the jacking means. Since the jacking means provides only a short stroke, it is not appreciably burdened with having to provide guidance. In this way, it is possible to achieve a very sensitive closing and pressing together of the upper and lower mold.

The movability of the mold holder will depend on how accessible one desires the mold to be. It is easily possible to make both mold holders movable; alternatively, only the upper or only the lower mold holder may be made movable. From certain technical and also economical viewpoints, the last-named type of construction will usually preferred. This construction also facilitates the charging of the reaction mixture into the closed mold.

A substantial improvement of the molding apparatus is obtained when both mold holders are mounted for movement. In addition to a greater opening width, which facilitates charging and the removal of the finished article, this also simplifies the changing of the mold.

In this connection also, it is not always necessary that both mold holders be moved into the closed position on rectilinear paths. Instead, swinging movements of at least one of the two mold holders are also possible. This has proven to be especially useful in the upper mold holder because, as a result, the possibility is obtained of uncovering the space above the bottom mold and bringing the top mold into a position in which it is freely accessible from above. Both mold parts can thus easily be replaced by means of a crane.

The two mold holders consist of rigid plates disposed in a stand. The stand is preferably of framed construction to make the entire design very sturdy.

The jacking system executes only a short stroke, which makes it possible to consider the use of hydraulic or pneumatic jacking elements. Jacking elements of this kind usually are of a pillowlike construction. They can consist of a flexible sheet material and are connected by a valve to a source of pressure medium.

Such jacking elements can be made from fabric-reinforced hose, such as the kind commonly used in firefighting. They are characterized by a high mechanical strength combined with good flexibility, so that the result is a virtually linear relationship between the closing force and the internal pressure in the hose. This favors the achievement of a sensitive contact between the two parts of the mold. In the case of elongated molds, such hoses are preferably disposed in the area of the longitudinal sides of the molds.

For a full understanding of the present invention, reference should now be made to the following detailed description of the preferred embodiment of the invention and to the accompanying drawings.

DESCRIPTION OF THE PREFERRED EMBODIMENTS

Figure 1:
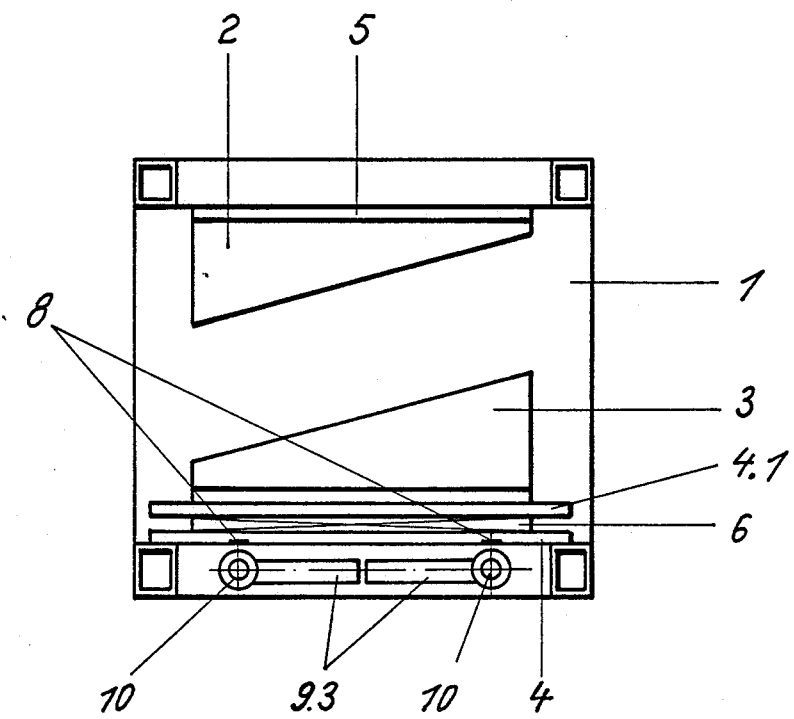
FIG. 1 is a cross view of molding apparatus, according to the present invention, with the upper and lower parts separated from one another.

The molding apparatus represented in the drawings includes a stand 1 which is composed of steel structures of large cross section welded together to form a frame. The stand is accordingly very strong and rigid and permits the direct connection of any accessories and attachments necessary for normal operation. The stand thus makes it possible for the mold to be made ready at a location separate from the later point of use. The interruptions of operation necessary for mold changing at the point of use can thus be minimized, and it is an advantage worth noting that accidental damage to the ready-to-operate unit during transport is largely prevented by the stand 1 that externally surrounds the unit.

Replacement of the complete unit therefore presents no difficulty, as a rule.

The stand 1 consists of the upper frame and lower frame, which are arranged one over the other in the same rectangular outline, and are fixedly joined at the corners by columns (which are not shown). The immovable mold holder 5, that supports the upper part 2 of the mold, is affixed to the upper frame, thereby assuring a precise relationship between it and the stand 1.

When the mold is open the movable mold holder 4 lies on the upper side of the bottom frame. It is additionally supported by a lifting device (not shown) that permits jacking in the direction of the upper frame. In order to prevent the mold holder 4 from shifting laterally, it is provided with guides (not shown) which are fitted around guiding rails on the columns running in the perpendicular direction. The lifting device serves only for jacking the bottom mold holder 4 to the first position. It can include, for example, motor driven rack-and-pinion or screw drives which apply a lifting force to the movable mold holder 4 with respect to the stand 1 in the area of the columns.

The travel of the lifting device is preferably slightly greater than necessary for reaching the first position so as to favor the trouble-free engagement of the blocking system which includes the levers 9.3. The blocking system is then actuated, for example, by a stepping mechanism. The lower mold holder 4 is applied with its back surfaces 8 on the levers 9.3 to relieve the stress on the lifting device. The lower mold holder 4 thus is situated in the first position. The subsequent steps of operation can also be controlled by the stepping mechanism.

The levers 9.3 are pivoted in the lower frame. Their movement is produced by two motor-driven shafts 10 to which the levers 9.3 are fastened at uniform intervals. When the blocking system is engaged they are parallel to the direction of the closing movement, and when it is disengaged they are at a right angle thereto.

In the embodiment represented, a jacking device 6 is disposed only on the lower mold holder 4. This consists of a jacking element in the form of a pressurizable air pillow which is placed under the auxiliary holder 4.1 and has an active pneumatic surface area corresponding to the size of the mold. By feeding it compressed air, the bottom mold part 3, which in the first position is still a slight distance away from the upper mold part 2, can thus be applied very carefully to the upper mold part 2 and can be uniformly pressed against this upper mold part. This is a great advantage in minimizing stress on the mold and in the production of high-quality moldings.

After the mold is filled and the reaction process has ended, the mold is again opened. For this purpose the air pillow is first deflated, thereby bringing the auxiliary mold holder 4.1 to rest on the lower, movable mold holder 4. The movable mold holder 4 is then slightly raised to relieve pressure on the levers 9.3 and disengage them. It can be brought back from the position shown in FIG. 2 to the position shown in FIG. 1. The finished molding can then be removed and the opened mold can be prepared for the next molding operation.

Figure 3:
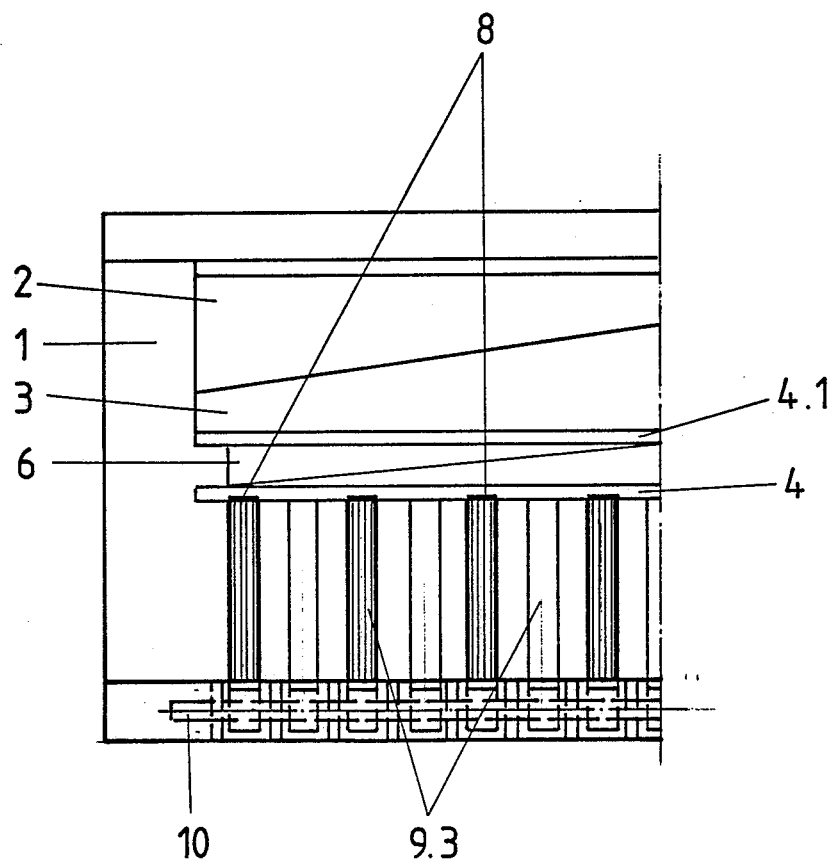
FIG. 3 is a detailed rear view of the molding apparatus shown in FIG. 2.

FIG. 3 shows the relationship between the levers 9.3 and the shafts 10 on which they are ganged. As can be seen, the levers along each shaft are at a constant, short distance apart resulting in good support of the movable mold holder 4 over its entire length. The flexural stress on the movable mold holder 4 in the direction of its longitudinal axis is accordingly low and permits a light-weight design. As a result, good acceleration can be achieved in the opening and closing of the mold by using only relatively low driving forces. The cycles are therefore short and facilitate the use of the mold according to the invention in mass production.

The levers 9.3 are operated by a common drive. In this regard it has been found desirable, from the constructional viewpoint, to make them of identical shape. If the levers 9.3 of the two shafts 10 are laid down, they intermesh in alternation with another as can be seen in dotted lines in FIG. 2.

Figure 4:
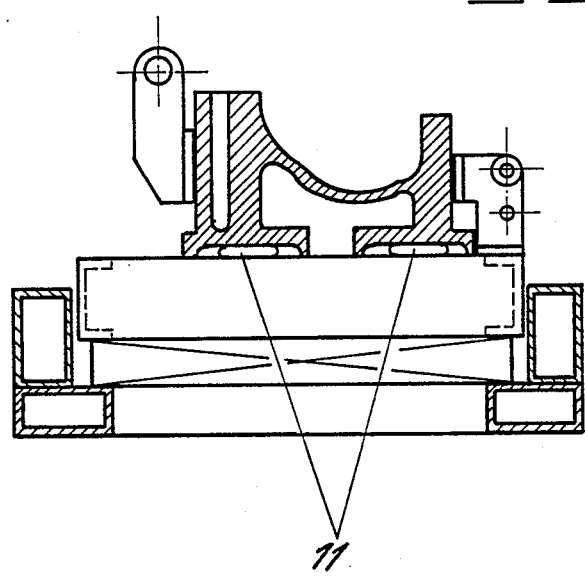
FIG. 4 illustrates an exemplary embodiment of a mold bottom mounted on a mold holder, in which the jacking mechanism consists of two air cushions connected in series.

FIG. 4 shows a bottom mold part in cross section in which the jacking system is formed by two elongated air cushions running parallel to one another. These are constituted by fabric reinforced fire hoses arranged in series underneath the longitudinal sides of the elongated mold. They have outstanding flexibility, combined with negligible expansion, so that there is a linear relationship between the internal pressure and the radial expansion of the diameter when a fluid medium is injected into them. The movement and its force can thus be sensitively controlled, and it is especially to be noted that any deformations of the mold holders and/or of the molds are automatically equalized. Even if such deformations should occur, therefore, a complete closing movement of the mold is assured in all areas, which simplifies the sealing of the mold. Undesirable lateral shifting of the mold bottom is prevented by the illustrated guiding means.

Figure 2:
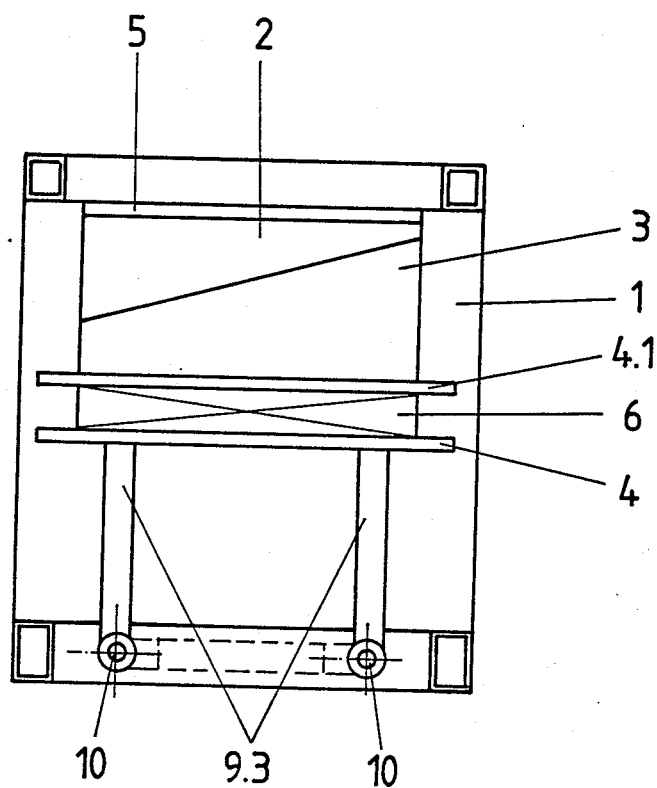
FIG. 2 is a cross view of the molding apparatus of FIG. 1 in the closed position.
Figure 5:
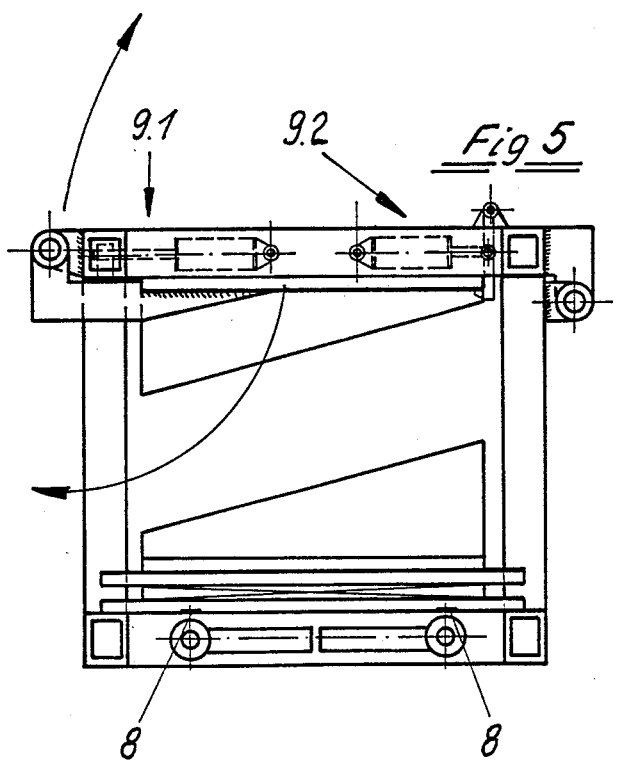
FIG. 5 is a cross view of molding apparatus, similar to that of FIG. 1, in which the mold bottom can be moved in a straight line and the mold top can be swung about an axis.

FIG. 5 illustrates molding apparatus, similar to that of FIG. 1, in which the space above the bottom mold can be made free to permit the bottom mold to be replaced by means of a crane. To achieve this purpose both the upper frame of the structure and the upper mold holder are mounted for rotation in the manner shown. As a result, the upper mold can also be replaced by means of a crane.

The rotation of the upper frame and upper mold holder is effected by piston-and-cylinder units (not shown). Other piston-and-cylinder units serve for the mechanical locking of the upper frame or upper mold holder in the position shown. They cooperate with a bolt lock 9.1 and a hook lock 9.2.

There has thus been shown and described a novel molding apparatus which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention which is limited only by the claims which follow.

What is claimed is:

1. In molding apparatus for producing a molding from a multi-component plastic, such as polyurethane, said apparatus including a stand; two mold holders arranged on said stand; two mold parts each affixed, respectively, to one of said mold holders; at least one mold holder being movable with respect to the other so as to bring its associated mold part to a first position in which the two mold parts are at a short distance apart; said mold holders having back surfaces provided on their sides facing away from their respective mold parts and extending substantially transversely to the direction of the closing movement of said movable mold holder;

a propping system mounted movably in the stand comprising propping elements which can be brought into engagement with said back surfaces when said mold parts are in said first position; and jacking means arranged on at least one mold holder, by which the mold parts can be brought closer together and pressed together in a second position with the propping system engaged, the improvement wherein said propping elements are levers which are affixed to at least one pair of contrarily rotatable shafts that are journaled in said stand on the side of a movable mold holder that faces away from said mold parts, such that said levers can be laid down in said stand substantially transversely to the direction of closing movement and can be rotated such that their end faces are brought into engagement with at least one of said back surfaces.

2. Molding apparatus according to claim 1, wherein said shafts are journaled in said stand perpendicular to the direction of movement of said jacking means.

3. Molding apparatus according to claim 1, wherein said shafts are disposed parallel to the plane of said back surfaces.

4. Molding apparatus according to claim 1, wherein said levers are of columnar shape.

5. Molding apparatus according to claim 1, wherein said levers are distributed over the entire length of said movable mold holder and are affixed to said shafts at uniform, short distances apart.

6. Molding apparatus according to claim 1, wherein said levers of each pair of said shafts are staggered from one another and can thus be laid down in alternation with one another.

7. Molding apparatus according to claim 1, wherein said movable mold holder is constructed as a rectangular plate and that said back surfaces are disposed in the area of the longitudinal edges of said plate.

* * * * *